United States Patent
Nakamura et al.

(10) Patent No.: US 9,435,691 B2
(45) Date of Patent: Sep. 6, 2016

(54) INFRARED SENSOR

(75) Inventors: Kenzo Nakamura, Naka (JP); Mototaka Ishikawa, Naka (JP); Gakuji Uozumi, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 410 days.

(21) Appl. No.: 14/003,728

(22) PCT Filed: Mar. 22, 2012

(86) PCT No.: PCT/JP2012/001976
§ 371 (c)(1),
(2), (4) Date: Sep. 6, 2013

(87) PCT Pub. No.: WO2012/132342
PCT Pub. Date: Oct. 4, 2012

(65) Prior Publication Data
US 2014/0010262 A1    Jan. 9, 2014

(30) Foreign Application Priority Data
Mar. 30, 2011    (JP) .................................. 2011-076768

(51) Int. Cl.
*G01J 5/02* (2006.01)
*G01J 5/08* (2006.01)
(Continued)

(52) U.S. Cl.
CPC ............... *G01J 5/02* (2013.01); *G01J 5/0096* (2013.01); *G01J 5/023* (2013.01); *G01J 5/0205* (2013.01); *G01J 5/04* (2013.01); *G01J 5/046* (2013.01); *G01J 5/0875* (2013.01); *G01J 5/20* (2013.01)

(58) Field of Classification Search
CPC .... G01J 5/0875; G01J 5/0096; G01J 5/0205; G01J 5/046; G01J 5/04; G01J 5/20; G01J 5/02; G01J 5/023
USPC ................. 374/121, 126, 128, 129, 130, 131
See application file for complete search history.

(56) References Cited

U.S. PATENT DOCUMENTS

| | | | | |
|---|---|---|---|---|
| 6,489,614 B1* | 12/2002 | Deguchi | ................... | G01J 5/20 250/332 |
| 2002/0040967 A1* | 4/2002 | Oda | .......................... | G01J 5/08 250/338.1 |

(Continued)

FOREIGN PATENT DOCUMENTS

| JP | 06186082 | 7/1994 |
|---|---|---|
| JP | 2003-194630 A | 7/2003 |

(Continued)

OTHER PUBLICATIONS

Notice of Refusal dated Sep. 10, 2014 issued in Japanese Application No. 2011-076768.

(Continued)

*Primary Examiner* — Lisa Caputo
*Assistant Examiner* — Philip Cotey
(74) *Attorney, Agent, or Firm* — Locke Lord LLP

(57) ABSTRACT

A lightweight infrared sensor that detects a temperature at a portion spaced apart from a circuit substrate with high accuracy, is installed on the circuit substrate easily and stably, and includes an insulating film; a first and a second heat sensitive elements are disposed on one surface of the insulating film separately; a first conductive film on the insulating film that is connected to the first heat sensitive element; a second conductive film connected to the second heat sensitive element; an infrared reflection film on the other surface of the insulating film so as to face the second heat sensitive element; a plurality of terminal electrodes formed on one end of the insulating film and fitted into an external connector; an edge reinforcing plate adhered to one end of one surface of the insulating film; and a mounting hole that is formed on the other end.

5 Claims, 6 Drawing Sheets

(51) Int. Cl.
   *G01J 5/00*   (2006.01)
   *G01J 5/04*   (2006.01)
   *G01J 5/20*   (2006.01)

(56) References Cited

U.S. PATENT DOCUMENTS

| | | | |
|---|---|---|---|
| 2005/0053117 A1* | 3/2005 | O'Neill | G01K 1/20 374/121 |
| 2005/0178967 A1* | 8/2005 | Nakaki | G01J 5/02 250/339.04 |
| 2005/0274892 A1* | 12/2005 | Oda | G01J 5/061 250/339.04 |
| 2005/0274896 A1* | 12/2005 | Kawano | G01J 5/20 250/370.14 |
| 2011/0175100 A1* | 7/2011 | Tsuji | G01J 5/02 257/66 |
| 2011/0305258 A1* | 12/2011 | Boutchich | G01J 5/12 374/130 |

FOREIGN PATENT DOCUMENTS

| | | |
|---|---|---|
| JP | 2004-061283 A | 2/2004 |
| JP | 2005-268404 A | 9/2005 |
| JP | 2006-228768 A | 8/2006 |
| JP | 2010-223589 A | 10/2010 |
| JP | 2011-013213 A | 1/2011 |
| TW | I262751 B | 9/2006 |
| WO | WO-2011046163 A1 | 4/2011 |
| WO | WO-2011078004 A1 | 6/2011 |

OTHER PUBLICATIONS

Office Action for Taiwanese Application No. 101110384 dated Sep. 3, 2015.
International Search Report of PCT/JP2012/001976.

* cited by examiner (a)        (b)

(a)　　　　　　　　(b)

INFRARED SENSOR

CROSS-REFERENCE TO RELATED APPLICATIONS

This application is a U.S. National stage application of PCT International Application No. PCT/JP2012/001976 filed Mar. 22, 2012, which claims the benefit of Japanese Patent Application No. 2011-076768 filed Mar. 30, 2011, the entire contents of the aforementioned applications are hereby incorporated herein by reference.

BACKGROUND OF THE INVENTION

1. Field of the Invention

The present invention relates to an infrared sensor that detects infrared radiation from a measurement object to thereby measure the temperature or the like of the measurement object.

2. Description of the Related Art

When the heat generation state of an electronic component (device) on a circuit substrate, such as a switching element such as FET, an electrolytic capacitor, or the like, is detected, there has been known a method in which a temperature sensor is provided on a circuit substrate in the vicinity of the device or a temperature sensor is provided in a heat sink connected to the device so as to indirectly know an element temperature from the temperature of the circuit substrate or the heat sink. In the method, the temperature of a measurement object such as a device or the like is indirectly detected, resulting in an increase in detection errors and difficulty in highly accurate detection.

Conventionally, infrared sensors have been used as temperature sensors that detect infrared radiation emitted from a measurement object without contact to thereby measure the temperature of the measurement object.

For example, Patent Document 1 discloses an infrared sensor that is a temperature sensor for measuring the temperature of a heating fixing roller or the like used in a fixing device for a copier and that includes a resin film that is disposed on a holder, a heat sensitive element for infrared detection that is provided on the resin film and detects infrared radiation via a light guide unit of the holder, and a heat sensitive element for temperature compensation that is provided on the resin film in a light-shielding state and detects the temperature of the holder. In the infrared sensor, an infrared absorbing film is formed on the inside surface of the light guide unit and an infrared absorbing material such as carbon black or the like is contained in the resin film so as to increase infrared absorption. Also, in the infrared sensor, the heat sensitive element is built into the holder which is a housing of a substantially block shape formed from a metal material such as aluminum having high heat conductivity and low thermal emissivity.

Also, Patent Document 2 discloses an infrared detector including a heat sensitive element for infrared detection, a heat sensitive element for temperature compensation, a resin film on which the heat sensitive element for infrared detection and the heat sensitive element for temperature compensation are fixed in a tight contact manner, and a case having a frame body in which the heat sensitive element for infrared detection is arranged on the side of an entrance window for infrared radiation and the heat sensitive element for temperature compensation is arranged on the side of a shielding unit for shielding infrared radiation. In the infrared detector, an infrared absorbing material such as carbon black or the like is contained in the resin film so as to increase infrared absorption and the frame body is formed with a material having excellent heat conductivity in order to eliminate the thermal gradient between the heat sensitive element for infrared detection and the heat sensitive element for temperature compensation. For the heat sensitive element for infrared detection and the heat sensitive element for temperature compensation, a radial lead thermistor in which a lead wire is in connection with a thermistor is employed. Furthermore, in the infrared detector, heat sensitive elements are built into the case formed of a resin or a metal.

These infrared sensors disclosed in Patent Documents 1 and 2 employ a structure in which an infrared absorbing material such as carbon black or the like is contained in the resin film and one of the heat sensitive elements is shielded from light so as to provide temperature compensation. However, the resin film containing an infrared absorbing material exhibits high heat conductivity and thus it becomes difficult to cause the temperature difference between the heat sensitive element for infrared detection and the heat sensitive element for temperature compensation. In addition, in order to increase the temperature difference between these heat sensitive elements, the distance between these heat sensitive elements needs to be spaced apart from each other, resulting in an increase in the overall shape of the infrared sensor and a difficulty in achieving size reduction of the same. Furthermore, the structure for shielding the heat sensitive element for temperature compensation from light needs to be provided on the case itself, which makes the infrared sensor more expensive.

In Patent Document 2, the frame body having excellent heat conductivity is employed, and thus, heat supplied from the infrared absorbing film is also dissipated, resulting in degradation in sensitivity. In addition, since a radial lead thermistor in which a lead wire is in connection with a thermistor is employed, heat conduction through a space occurs between the thermistor and the lead wire.

Furthermore, although the infrared sensor disclosed in Patent Document 2 employs a structure in which one of the heat sensitive elements is shielded from infrared radiation with the housing, the shielding portion of the case which only blocks infrared radiation absorbs infrared radiation, resulting in changes in the temperature of the shielding portion. Consequently, the heat sensitive element for temperature compensation is inappropriate for use as a reference.

Thus, as disclosed in Patent Document 3, there has been developed an infrared sensor that includes an insulating film, a first heat sensitive element and a second heat sensitive element that are disposed on one surface of the insulating film so as to be separated apart from one another, a plurality pairs of conductive wiring films that are formed on one surface of the an insulating film and are separately connected to the first heat sensitive element and the second heat sensitive element, an infrared absorbing film that is disposed on the other surface of the insulating film so as to face the first heat sensitive element, and an infrared reflection film that is disposed on the other surface of the insulating film so as to face the second heat sensitive element.

In the infrared sensor, a portion at which the infrared absorbing film is provided absorbs infrared radiation and a portion at which the infrared reflection film is provided reflects infrared radiation, so that a favorable temperature difference can be obtained between the first heat sensitive element and the second heat sensitive element on a thin insulating film having low heat conductivity. Specifically, even in the case of the insulating film having low heat conductivity without containing an infrared absorbing material or the like, the heat generated by infrared absorption can be conducted only to a portion immediately above the first heat sensitive element on the insulating film. In particular, the heat conduction from the infrared absorbing film is performed through the thin insulating film, resulting in no degradation in sensitivity and obtaining high responsiveness. Since the area of the infrared absorbing film can be arbitrarily set, a viewing angle for infrared detection can be set by area in accordance with the distance to the measurement object, resulting in obtaining high light receiving efficiency. Also, the infrared reflection film reflects infrared radiation directed toward a portion immediately above the second heat sensitive element on the insulating film so that infrared absorption can be prevented. It should be noted that since the infrared absorbing film and the infrared reflection film are formed on the insulating film, a medium of heat conduction between the infrared absorbing film and the infrared reflection film is only the insulating film on which these films are opposed to one another other than air, resulting in a reduction in cross-sectional area for heat conduction. Thus, heat is difficult to be conducted to the heat sensitive elements which are opposed to one another so that heat interference is reduced, resulting in an improvement in detection sensitivity. As described above, the infrared sensor has a structure in which the first heat sensitive element and the second heat sensitive element, for which the effects of heat are suppressed from one another, on the insulating film having low heat conductivity, measure the partial temperature of the insulating film directly below the infrared absorbing film and directly below the infrared reflection film, respectively. Thus, a favorable temperature difference can be obtained between the first heat sensitive element for infrared detection and the second heat sensitive element for temperature compensation, resulting in an increase in sensitivity.

PRIOR ART DOCUMENTS

Patent Documents

[Patent Document 1] Japanese Unexamined Patent Application Publication No. 2002-156284 (Paragraph [0026], FIG. 2)
[Patent Document 2] Japanese Unexamined Patent Application Publication No. 7-260579 (Claims, FIG. 2)
[Patent Document 3] Japanese Unexamined Patent Application Publication No. 2011-13213 (Claims, FIG. 1)

SUMMARY OF THE INVENTION

Problems to be Solved by the Invention

However, the following problems still remain in the conventional techniques described above.

In the case of the attachment of the infrared sensor disclosed in Patent Documents 1 to 3, dedicated large attaching structure and supporting structure need to be employed for attaching a housing or a case of a block shape. Consequently, a large installation space must be ensured, resulting in higher costs.

For example, as shown in FIG. 7, it is also contemplated that a thermopile (101) serving as an infrared sensor is fixed to a mounting substrate (102) standing perpendicularly so as to detect a temperature from the lateral direction of the device. In this case, the infrared sensor has a structure where the thermopile (101) is sealed into a metal can, resulting in a large volume and an increase in thickness. Consequently, a large area and a installation space may undesirably be needed as in Patent Documents described above. Thus, it becomes difficult to reduce the size of the entire device or the entire circuit substrate on which the infrared sensor is mounted and to achieve high-density packaging thereof. In addition, since the thermopile (101) is heavy, high support strength needs to be obtained by a support structure such as a large support member (103) or the like in order to stand the mounting substrate (102) perpendicularly to a circuit substrate (104). In particular, as shown in FIG. 8, when the portion S1 of a measurement object S for which the temperature is desired to be measured is spaced apart from the surface of the circuit substrate (104), the mounting substrate (102) becomes longer in order to ensure the height (distance) from the circuit substrate (104) to the detection position of the thermopile (101). For an in-vehicle infrared sensor, the fixation of the mounting substrate (102) to the circuit substrate (104) may be loosened by vibration. In addition, the viewing angle of infrared radiation may be shaken by the vibration of the mounting substrate (102), resulting in a degradation in detection accuracy due to vibration noise. Furthermore, the thermopile (101) needs to be soldered, resulting in an increase in attaching steps and an increase in costs.

The present invention has been made in view of the aforementioned circumstances, and an object of the present invention is to provide an infrared sensor that is lightweight, is capable of detecting a temperature at a portion spaced apart from a circuit substrate with high accuracy, and is easily attached to the circuit substrate in a stable installed state.

Means for Solving the Problems

The present invention adopts the following structure in order to solve the aforementioned problems. Specifically, an infrared sensor according to a first aspect of the present invention is characterized in that the infrared sensor includes an insulating film; a first heat sensitive element and a second heat sensitive element that are disposed on one surface of the insulating film so as to be separated apart from one another; a first conductive wiring film and a second conductive wiring film that are formed on one surface of the insulating film and are respectively connected to the first heat sensitive element and the second heat sensitive element; an infrared reflection film that is disposed on the other surface of the insulating film so as to face the second heat sensitive element; a plurality of terminal electrodes that are connected to the first wiring film and the second wiring film, are formed on one end of the other surface of the insulating film, and are capable of being fitted into an external connector; an edge reinforcing plate that is adhered to one end of one surface of the insulating film; and a mounting hole that is formed on the other end of the insulating film.

Since the infrared sensor includes a plurality of terminal electrodes that are formed on one end of the insulating film and are capable of being fitted into an external connector; an edge reinforcing plate that is adhered to one end of the insulating film; and a mounting hole that is formed on the other end of the insulating film, the terminal electrodes on one end of the insulating film reinforced by the edge reinforcing plate with high-rigidity are fit into a connector so that the terminal electrodes can readily be fixed to and be electrically connected to a circuit substrate or the like, and the other end of the insulating film can be fixed to another external member located remote from the connector with screws using the mounting hole. With this arrangement, both ends of the insulating film are fixed in a tensed state so that the entire infrared sensor is stably supported. Thus, even when the sensor part including the first heat sensitive element, the second heat sensitive element, the infrared reflection film is arranged apart from the connector, the shake of the viewing angle of the sensor part due to vibration and the application of vibration noise may be suppressed. Since the insulating film is flexible, the position at which the other end of the infrared sensor is mounted by the mounting hole can also be offset from directly above the connector, so that the infrared detecting direction can be arbitrarily changed by changing the inclination of the sensor part. Thus, the one end of the infrared sensor is inserted into the connector mounted by reflow soldering on the circuit substrate and the other end of the infrared sensor is readily and fixedly mounted using the mounting hole. Consequently, the infrared sensor is also mountable in a small installation space, is suitable for achieving high-density packaging thereof, and can also detect the temperature of a position away from the circuit substrate with high accuracy.

An infrared sensor according to a second aspect of the present invention is characterized in that the infrared sensor further includes a sensor part reinforcing frame on which a sensor part window corresponding to the region of the first heat sensitive element, the second heat sensitive element, and the infrared reflection film is formed and which is adhered to one surface of the insulating film so as to surround the region according to the first aspect of the present invention.

Specifically, since the infrared sensor includes a sensor part reinforcing frame which is adhered to one surface of the insulating film so as to surround the region of the first heat sensitive element, the second heat sensitive element, and the infrared reflection film, the sensor part reinforcing frame provides greater rigidity around the region serving as the sensor part, stress to be applied to the first heat sensitive element and the second heat sensitive element upon tension can be suppressed. It should be noted that since the sensor part window is hollowed out within the sensor part reinforcing frame so as to provide space to the sensor part, the sensor part reinforcing frame does not obstruct mounting of the first heat sensitive element and the second heat sensitive element and the sensor part is suppressed from being affected by the effects of heat conduction from the sensor part reinforcing frame.

An infrared sensor according to a third aspect of the present invention is characterized in that a plurality of sensor parts each consisting of at least the first heat sensitive element, the second heat sensitive element, and the infrared reflection film is provided to the insulating film and all of the terminal electrodes corresponding to the sensor parts are formed on one end of the insulating film according to the first or the second aspect of the present invention.

Specifically, since, in the infrared sensor, a plurality of sensor parts is provided to the insulating film and all of the terminal electrodes corresponding to the sensor parts are formed on one end of the insulating film, one end of the insulating film is inserted into a connector for fixation and the other end thereof is fixed to an external member or the like. Consequently, a plurality of sensor parts can be arranged and a temperature at a plurality of locations can be detected. Also, since a plurality of sensor parts is integrally formed on one insulating film, there is no need to provide a plurality of electricity conducting wires so that the assembling steps can be simplified and the vibration resistance can also be ensured. Thus, the infrared sensor of the present invention is preferably used for detecting temperature at a plurality of locations in a battery unit such as a Li-ion battery unit or the like, the front window of an air conditioner, and the like.

An infrared sensor according to a fourth aspect of the present invention is characterized in that a sealing member for sealing the sensor part window is adhered to the sensor part reinforcing frame according to the second aspect of the present invention.

Specifically, since in the infrared sensor, a sealing member for sealing the sensor part window is adhered to the sensor part reinforcing frame, the sensor part may be covered with the space provided by the sealing member so that the effects of air convection and infrared radiation from the back surface of the infrared sensor may be reduced.

An infrared sensor according to a fifth aspect of the present invention is characterized in that the first wiring film is arranged around the first heat sensitive element and is formed to have a larger area than that of the second wiring film according to any one of the first to fourth aspects of the present invention.

Specifically, since, in the infrared sensor, the first wiring film is arranged around the first heat sensitive element and is formed to have a larger area than that of the second wiring film, the first wiring film improves heat collection from a portion of the insulating film at which infrared radiation has been absorbed and a heat capacity of the first wiring film becomes close to that of a portion in which the infrared reflection film is formed on the insulating film, resulting in a reduction in variation error. It is preferable that the area and the shape of the first wiring film are set such that the heat capacity of the first wiring film is substantially the same as that of a portion in which the infrared reflection film is formed on the insulating film.

Effects of the Invention

According to the present invention, the following effects may be provided.

Specifically, since the infrared sensor of the present invention includes a plurality of terminal electrodes that are formed on one end of the insulating film and are capable of being fitted into an external connector; an edge reinforcing plate that is adhered to one end of the insulating film; and a mounting hole that is formed on the other end of the insulating film, the one end of the infrared sensor is inserted into the connector and the other end of the infrared sensor is readily and fixedly mounted using the mounting hole. Consequently, the infrared sensor is also mountable in a small installation space, is suitable for achieving high-density packaging thereof, and can also detect the temperature of a position away from the circuit substrate with high accuracy.

BEST MODES FOR CARRYING OUT THE INVENTION

Figure 1:
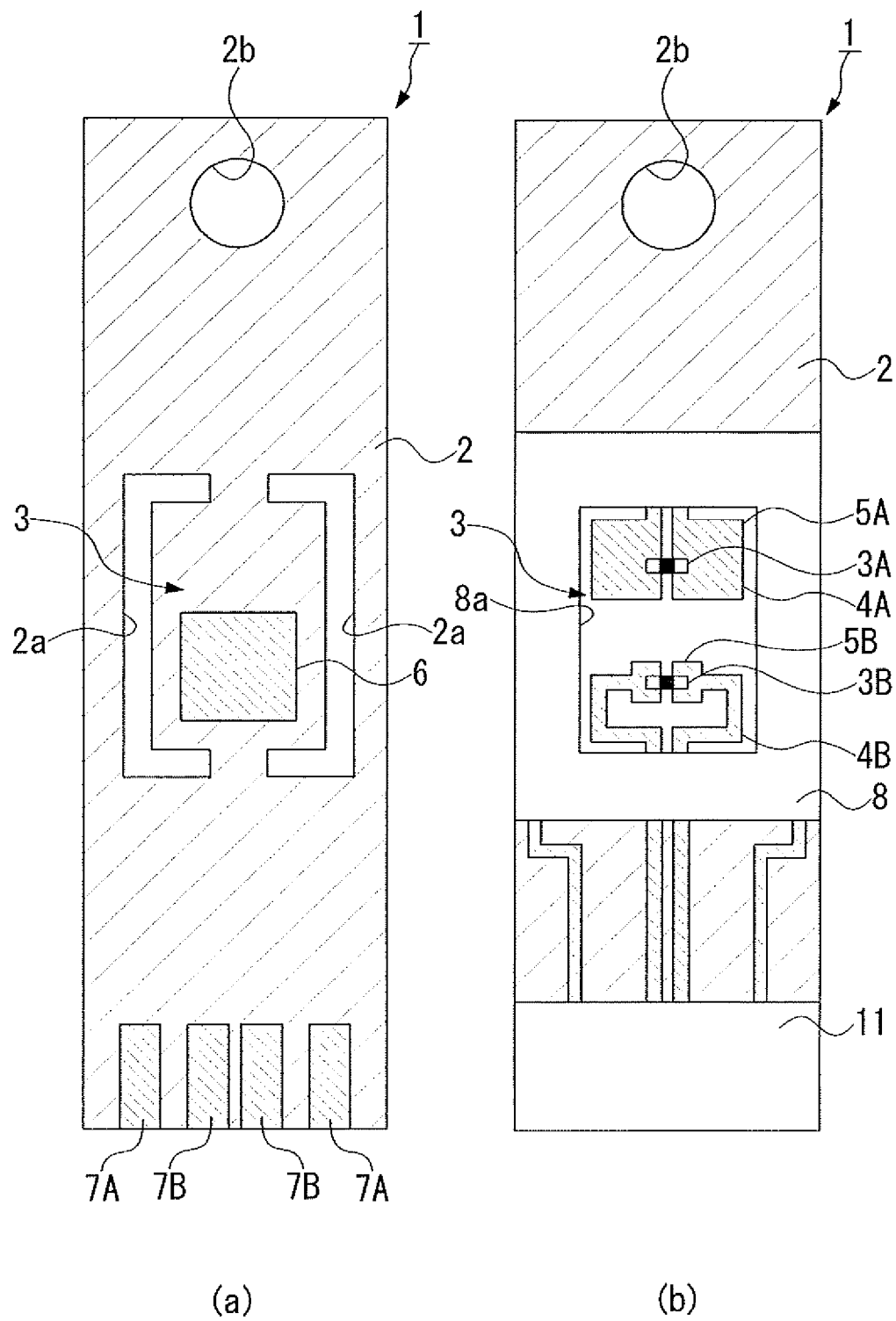
FIG. 1(a) is a front view illustrating an infrared sensor according to a first embodiment of the present invention.
FIG. 1(b) is a rear view illustrating an infrared sensor with a sealing member removed.

Hereinafter, a description will be given of an infrared sensor according to a first embodiment of the present invention with reference to FIGS. 1 to 4. In the drawings used in the following description, the scale of each component is changed as appropriate so that each component is recognizable or is readily recognized.

As shown in FIGS. 1 to 4, an infrared sensor (1) of the present embodiment includes an insulating film (2); a first heat sensitive element (3A) and a second heat sensitive element (35) that are disposed on one surface of the insulating film (2) so as to be separated apart from one another; a pair of first conductive wiring films (4A) serving as conductive metal films that are formed on one surface of the insulating film (2) and are connected to the first heat sensitive element (3A); a pair of second conductive wiring films (4B) serving as conductive metal films that are connected to the second heat sensitive element (3B); an infrared reflection film (6) that is disposed on the other surface of the insulating film (2) so as to face the second heat sensitive element (3B); the first terminal electrodes (7A) and the second terminal electrodes (7B) that are connected to the first wiring films (4A) and the second wiring films (4B), are formed on one end of the other surface of the insulating film (2), and are capable of being fitted into an external connector (9); an edge reinforcing plate (11) that is adhered to one end of one surface of the insulating film (2); and a mounting hole (2b) that is formed on the other end of the insulating film (2).

The infrared sensor (1) further includes a sensor part reinforcing frame (8) on which a sensor part window (8a) corresponding to the region of the first heat sensitive element (3A), the second heat sensitive element (3B), and the infrared reflection film (6) is formed and which is adhered to one surface of the insulating film (2) so as to surround the region.

As shown in FIG. 1 and FIG. 4(a), the pair of first wiring films (4A) have a pair of first adhesion electrodes (5A) formed on the insulating film (2) on one end thereof and are connected to a pair of first terminal electrodes (7A) formed on the opposite surface (the other surface) of the insulating film (2) on the other end of the infrared sensor via a through hole (not shown).

Also, the pair of second wiring films (4B) have a pair of second adhesion electrodes (5B) formed on the insulating film (2) on one end thereof and are connected to a pair of second terminal electrodes (7B) formed on the opposite surface (the other surface) of the insulating film (2) on the other end of the infrared sensor via a through hole (not shown).

The pair of first adhesion electrodes (5A) are arranged around the first heat sensitive element (3A) and is formed to have a larger area than that of the second adhesion electrodes (5B). These first adhesion electrodes (5A) have the first heat sensitive element (3A) that is arranged substantially at the center of the pair of the electrodes (5A) and are set to have substantially the same area as that of the infrared reflection film (6). Specifically, the first adhesion electrodes (5A) are set to have substantially the same heat capacity as that of a portion in which the infrared reflection film (6) is formed on the insulating film (2).

Note that the terminal electrodes (3a) of the first heat sensitive element (3A) and the second heat sensitive element (3B) are adhered to the first adhesion electrodes (5A) and the second adhesion electrodes (5B), respectively, via a conductive adhesive such as solder.

The insulating film (2) is formed of a polyimide resin sheet in the shape of a band. The infrared reflection film (6), the first wiring films (4A), the second wiring films (4B), the first terminal electrodes (7A), and the second terminal electrodes (7B) are formed by copper foil. Specifically, a double-sided flexible substrate is produced such that copper foil electrodes serving as the infrared reflection film (6), the first wiring films (4A), and the second wiring films (4B) are pattern-formed on both sides of the polyimide substrate serving as the insulating film (2).

The insulating film (2) is provided with a pair of elongated holes (2a) that extend on the periphery of the first heat sensitive element (3A) and the second heat sensitive element (3B) so as to avoid the first wiring films (4A) and the second wiring films (4B). These elongated holes (2a) are grooves that are opposite one another and are hollowed out in a squared U-shape, and the region formed therebetween is a central mounting region on which the first heat sensitive element (3A) and the second heat sensitive element (3B) are mounted and on which the first wiring films (4A), the second wiring films (4B), and the infrared reflection film (6) are formed. The region between the ends of the pair of elongated holes (2a) which are opposite one another is a wiring region through which the first wiring films (4A) and the second wiring films (4B) pass and also serve as the support for the central mounting region.

Furthermore, as shown in FIG. 1(a), the infrared reflection film (6) is arranged in a square shape immediately above the second heat sensitive element (3B) and is constituted by a copper foil and a gold-plated film deposited on the copper foil. In this case, the gold-plated film functions as an antioxidant film for the copper foil and improves infrared reflectivity. Note that a polyimide resin coverlay (not shown) that covers the entire surface including the first wiring films (4A) and the second wiring films (4B) and excluding the first terminal electrodes (7A) and the second terminal electrodes (7B) is formed on the back surface of the insulating film (2).

The infrared reflection film (6) is formed of a material having higher infrared reflectivity than that of the insulating film (2) and is constituted by a copper foil and a gold-plated film deposited on the copper foil as described above. Instead of the gold-plated film, a mirror finished aluminum vapor-deposited film, an aluminum foil, or the like may also be deposited on the copper foil. The infrared reflection film (6) has a greater size than that of the second heat sensitive element (3B) so as to cover the second heat sensitive element (3B).

Figure 2:
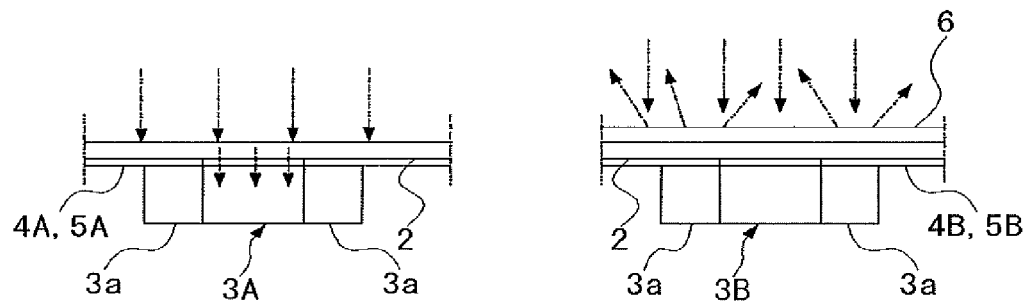
FIG. 2(a) is an enlarged front view illustrating essential parts of a portion with the first heat sensitive element adhered thereto according to the first embodiment.
FIG. 2(b) is an enlarged front view illustrating essential parts of a portion with the second heat sensitive element adhered thereto according to the first embodiment.

As shown in FIG. 2, each of the first heat sensitive element (3A) and the second heat sensitive element (3B) is a chip thermistor in which the terminal electrode (3a) is formed on both ends thereof. Examples of such a thermistor include an NTC type thermistor, a PTC type thermistor, a CTR type thermistor, and the like. In the present embodiment, an NTC type thermistor is employed as each of the first heat sensitive element (3A) and the second heat sensitive element (3B). The thermistor is formed of a thermistor material such as a Mn—Co—Cu-based material, a Mn—Co—Fe-based material, or the like. The first heat sensitive element (3A) and the second heat sensitive element (3B) are mounted on the insulating film (2) by bonding the terminal electrodes (3a) to the first adhesion electrode (5A) and the second adhesion electrode (5B) corresponding to the first heat sensitive element (3A) and the second heat sensitive element (3B), respectively.

In particular, in the present embodiment, a ceramic sintered body containing Mn, Co and Fe metal oxides, i.e., a thermistor element formed of a Mn—Co—Fe-based material is employed as the first heat sensitive element (3A) and the second heat sensitive element (3B). Furthermore, it is preferable that the ceramic sintered body has a crystal structure in which the main phase is a cubic spinel phase. In particular, it is most preferable that the ceramic sintered body has a crystal structure having a single phase consisting of a cubic spinel phase. The reason why a crystal structure in which the main phase is a cubic spinel phase is employed as the ceramic sintered body is because the cubic spinel phase has no anisotropy and has no impurity layer and thus the variation in electric characteristic is small within the ceramic sintered body so that highly accurate measurement can be achieved by the first heat sensitive element (3A) and the second heat sensitive element (3B). The ceramic sintered body has such a stable crystal structure, resulting in improved reliability for resistance to environment.

Each of the sensor part reinforcing frame (8) and the edge reinforcing plate (11) is formed of an insulating rigid resin substrate such as a glass epoxy substrate or the like. As shown in FIG. 1(b), the sensor part window (8a) of rectangular shape corresponding to the sensor part (3) is formed in the sensor part reinforcing frame (8). The sensor part window (8a) is formed on the inside of the pair of elongated holes (2a) and is formed so as to surround the first adhesion electrodes (5A) and the second adhesion electrodes (5B).

As shown in FIG. 4(b), a sealing member (10) for sealing the sensor part window (8a) is adhered to the back surface of the sensor part reinforcing frame (8). It is preferable that the sealing member (10) can reflect infrared radiation from the outside. As the sealing member (10), the same film as the infrared reflection film (6), an aluminum foil, or the like may also be employed.

The edge reinforcing plate (11) is formed in a rectangular shape so as to correspond to the shape of one end of the insulating film (2).

Figure 3:
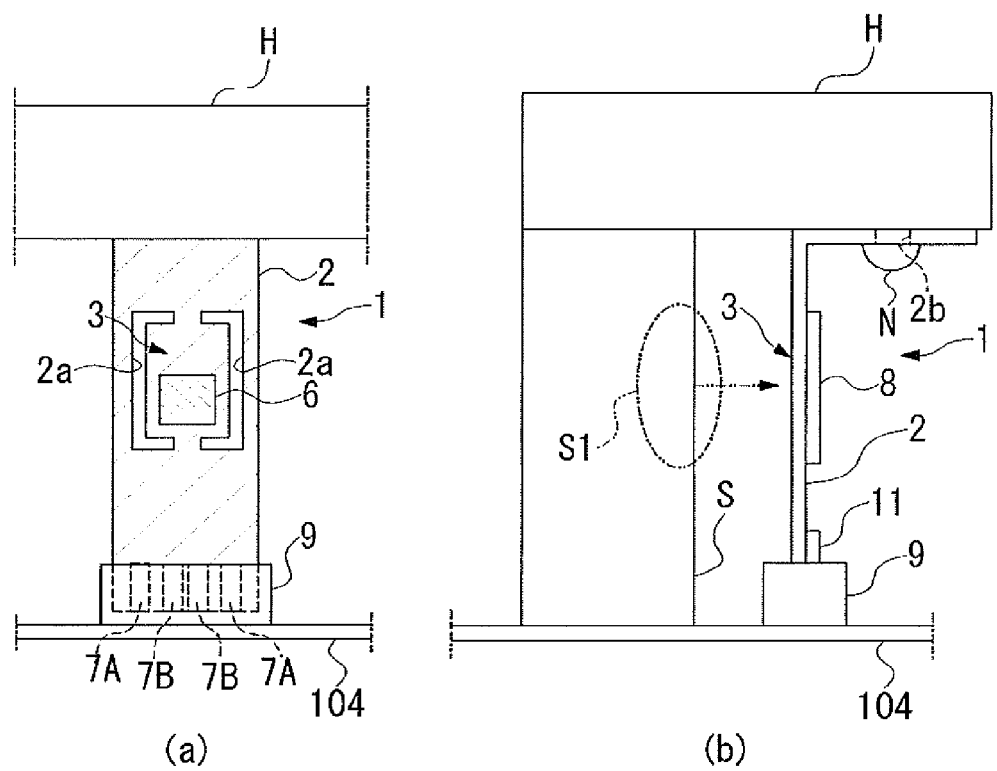
FIG. 3(a) is a front view illustrating the infrared sensor of the first embodiment in an installed state.
FIG. 3(b) is a side view illustrating the infrared sensor of the first embodiment in an installed state.
Figure 4:
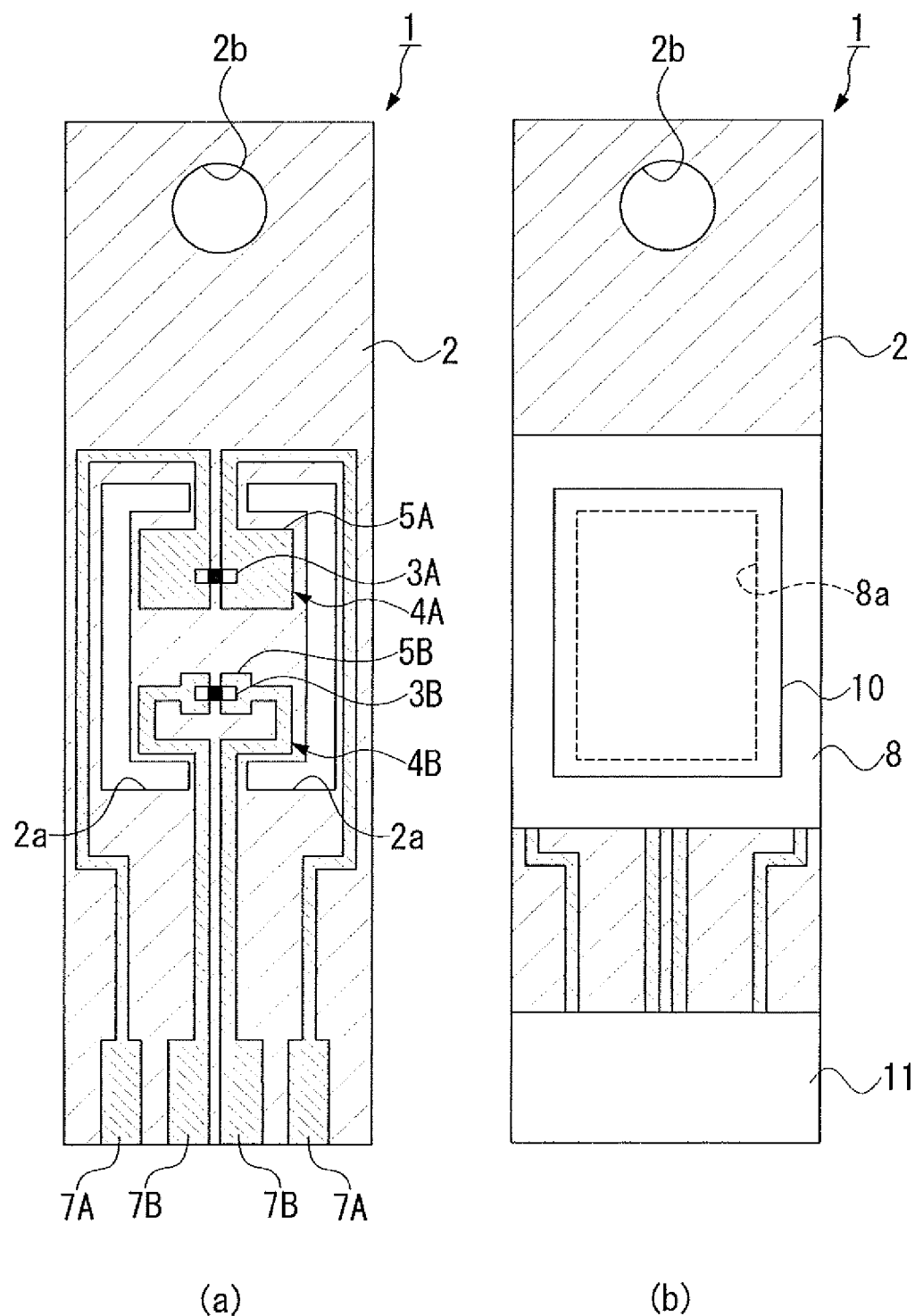
FIG. 4(a) is a rear view illustrating the infrared sensor of the first embodiment with a sensor part reinforcing frame and an edge reinforcing plate being removed therefrom.
FIG. 4(b) is a rear view illustrating the infrared sensor with a sealing member adhered thereto.

As shown in FIG. 3, one end of the infrared sensor (1), i.e., the end portion having the first terminal electrodes (7A), the second terminal electrodes (7B), and the edge reinforcing plate (11) is inserted into the connector (9) on the circuit substrate (104) and the other end of the infrared sensor (1) is fixed with a screw N through the mounting hole (2b) to the external member H such as a housing, a heat sink, or the like which is arranged above the connector (9) for implementation. Since the other end of the insulating film (2) is flexible, the other end of the insulating film (2) can be folded or curved so that the other end of the insulating film (2) can be attached to the external member H so as to correspond to the orientation of the mounting surface of the external member H. At this time, the infrared sensor (1) is installed such that the other surface of the insulating film (2), i.e., the surface on which the infrared reflection film (6) is formed is directed toward the measurement object S such as an electrolytic capacitor, a switching element, or the like.

As described above, since the infrared sensor (1) of the present embodiment includes the first terminal electrodes (7A) and the second terminal electrodes (7B) that are formed on one end of the other surface of the insulating film (2) and are capable of being fitted into the external connector (9); the edge reinforcing plate (11) that is adhered to one end of one surface of the insulating film (2); and the mounting hole (2b) that is formed on the other end of the insulating film (2), the terminal electrodes (7A) and (7B) on one end of the insulating film (2) reinforced by the edge reinforcing plate (11) with high-rigidity are fit into the connector (9) so that the terminal electrodes (7A) and (7B) can readily be fixed to and be electrically connected to the circuit substrate (104), and the other end of the insulating film (2) can be fixed to an external member H such as a housing, a heat sink, or the like located remote from the connector (9) with screws using the mounting hole (2b).

With this arrangement, both ends of the insulating film (2) are fixed in a tensed state so that the entire insulating film (2) is stably supported. Thus, even when the sensor part (3) including the first heat sensitive element (3A), the second heat sensitive element (3B), and the infrared reflection film (6) is arranged apart from the connector (9), the shake of the viewing angle of the sensor part (3) due to vibration and the application of vibration noise may be suppressed. Specifically, as shown in FIG. 3(b), even when the portion S1 of the measurement object S for which the temperature is desired to be measured is spaced apart from the circuit substrate (104), the sensor part (3) can be readily and stably arranged so as to bring the portion S1 into opposition.

Since the insulating film (2) is flexible, the position at which the other end of the infrared sensor (1) is installed by the mounting hole (2b) can also be offset from directly above the connector (9), so that the infrared detecting direction can be arbitrarily changed by changing the inclination of the sensor part (3). Thus, the one end of the infrared sensor (1) is inserted into the connector (9) mounted by reflow soldering on the circuit substrate (104) and the other end of the infrared sensor (1) is readily and fixedly mounted using the mounting hole (2b). Consequently, the infrared sensor (1) is also mountable in a small installation space, is suitable for achieving high-density packaging thereof, and can also detect the temperature of a position away from the circuit substrate (104) with high accuracy.

Since the infrared sensor (1) includes the sensor part reinforcing frame (8) which is adhered to one surface of the insulating film (2) so as to surround the region of the first heat sensitive element (3A), the second heat sensitive element (3B), and the infrared reflection film (6), the sensor part reinforcing frame (8) provides greater rigidity around the region serving as the sensor part (3), stress to be applied to the first heat sensitive element (3A) and the second heat sensitive element (3B) upon tension can be suppressed. It should be noted that since the sensor part window (8a) is hollowed out within the sensor part reinforcing frame (8) so as to provide space to the sensor part (3), the sensor part reinforcing frame (8) does not obstruct mounting of the first heat sensitive element (3A) and the second heat sensitive element (3B), and the sensor part (3) is suppressed from being affected by the effects of heat conduction from the sensor part reinforcing frame (8).

Furthermore, since the sealing member (10) for sealing the sensor part window (8a) is adhered to the sensor part reinforcing frame (8), the sensor part (3) may be covered with the space provided by the sealing member (10) so that the effects of air convection and infrared radiation from the back surface of the infrared sensor (1) may be reduced.

Since the insulating film (2) is provided with a pair of elongated holes (2a) that extend on the periphery of the first heat sensitive element (3A) and the second heat sensitive element (3B) so as to avoid the first wiring films (4A) and the second wiring films (4B), heat conduction from an infrared absorption region on the first heat sensitive element (3A) to the surrounding environment is blocked by the elongated holes (2a), so that radiation heat from the measurement object S can be thermally isolated for efficient accumulation. In order to prevent temperature distribution from being disturbed by radiation heat from the measurement object S, heat conduction from a portion which is thermally affected by a peripheral device is blocked by the elongated holes (2a) so that the effects of heat conduction can be suppressed.

Since the first wiring film (4A) is arranged around the first heat sensitive element (3A) and is formed to have a larger area than that of the second wiring film (4B), the first wiring film (4A) improves heat collection from a portion of the insulating film (2) at which infrared radiation has been absorbed and a heat capacity of the first wiring film (4A) becomes close to that of a portion in which the infrared reflection film (6) is formed on the insulating film (2), resulting in a reduction in variation error.

Next, a description will be given below of an infrared sensor according to a second embodiment of the present invention with reference to FIGS. 5 and 6. In the description of the following embodiment, the same components described in the above embodiment are designated by the same reference numerals and a duplicated explanation will be omitted.

Figure 6:
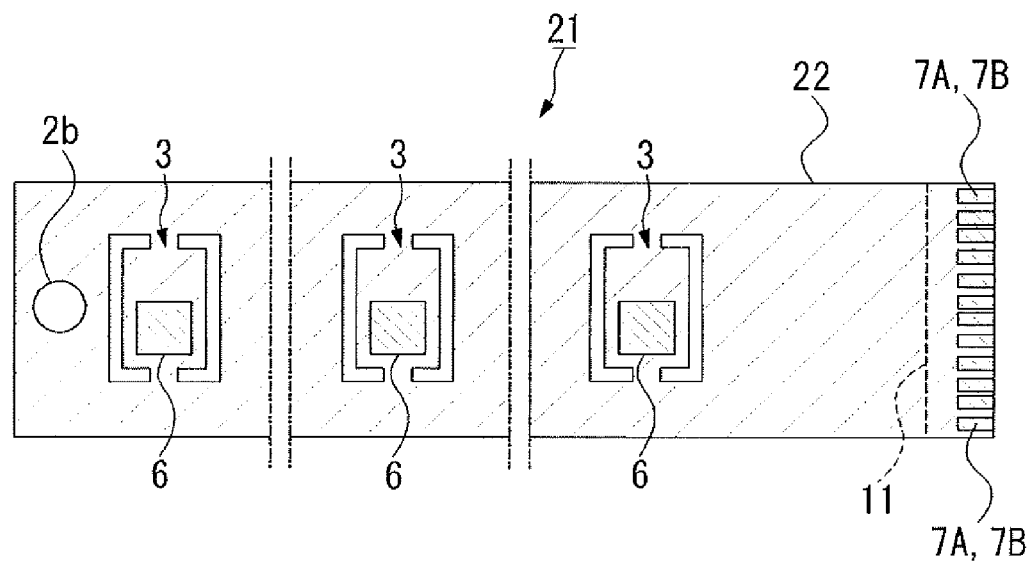
FIG. 6 is a front view illustrating an infrared sensor according to a second embodiment of the present invention.
Figure 7:
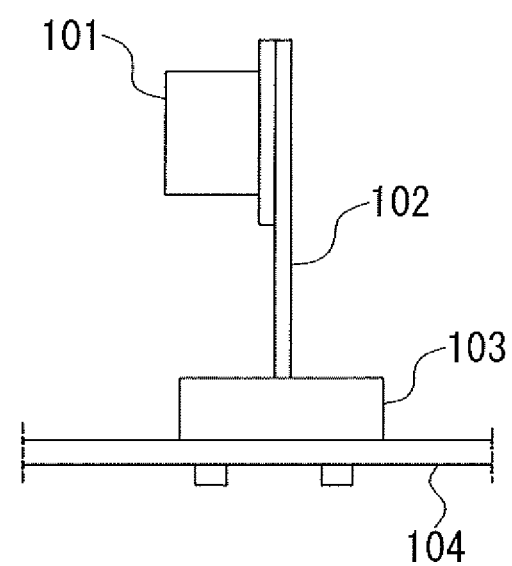
FIG. 7 is a side view illustrating a thermopile erected on a substrate according to a reference example of the present invention.
Figure 8:
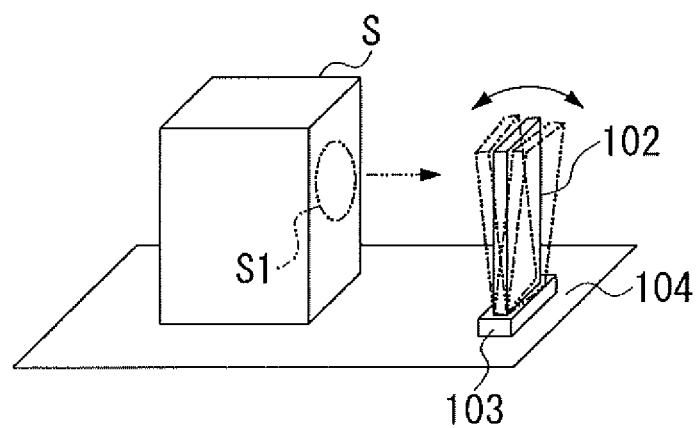
FIG. 8 is a perspective view illustrating the state of vibration of an infrared sensor erected on a substrate according to a reference example of the present invention.

The second embodiment differs from the first embodiment in that, while only one sensor part (3) having the first heat sensitive element (3A) and the second heat sensitive element (3B) is provided on the insulating film (2) in the first embodiment, an infrared sensor (21) of the second embodiment is structured such that the sensor part (3) consisting of at least the first heat sensitive element (3A), the second heat sensitive element (3B), and the infrared reflection film (6) is provided in plural on the insulating film (22) and all of the terminal electrodes (7A) and (7B) corresponding to the plurality of sensor parts (3) are formed at one end of the insulating film (22) as shown in FIG. 6.

Specifically, the second embodiment, the insulating film (22) is longer than the insulating film (2) of the first embodiment and a plurality (three in FIG. 6) of sensor parts (3) is provided so as to be spaced apart from one another in the elongation direction. These sensor parts (3) are connected to the terminal electrodes (7A) and (78) at one end of the insulating film (22) via the first wiring film and the second wiring film, respectively.

Figure 5:
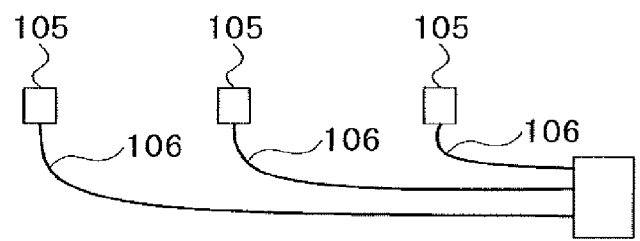
FIG. 5 is a view illustrating an example of a simple conventional configuration using a plurality of temperature sensors.

Conventionally, as shown in FIG. 5, a plurality of temperature sensors (105) and a plurality of electricity conducting wires (106) connected thereto need to be arranged at locations in order to detect temperature at a plurality of locations. Consequently, the steps of routing and attaching the electricity conducting wires (106) become troublesome and thick wires are undesirably required as the electricity conducting wires (106) in order to ensure vibration resistance.

In contrast, since, in the infrared sensor (21) of the second embodiment, the sensor part (3) is provided in plural on the insulating film (22) and all of the terminal electrodes (7A) and (7B) corresponding to the plurality of sensor parts (3) are formed at one end of the insulating film (22), one end of the infrared sensor (21) is fixed by inserting it into a connector and the other end thereof is fixed to an external member or the like so that a plurality of sensor parts (3) can be arranged and temperature can be detected at a plurality of locations. Also, since a plurality of sensor parts (3) is integrally formed on one insulating film (22), there is no need to provide a plurality of temperature sensors (105) and a plurality of electricity conducting wires (106), so that the assembling steps can be simplified and the vibration resistance can also be ensured.

Thus, the infrared sensor (21) is preferably used for detecting temperature at a plurality of locations in a battery unit such as a Li-ion battery unit or the like, the front window of an air conditioner, and the like.

While, in the second embodiment, the mounting hole (2b) is formed only at the other end of the insulating film (22), one or a plurality of mounting holes (2b) may also be formed in the midway of the long insulating film (22) so as to be fixed with screws to an external member or the like.

The technical scope of the present invention is not limited to the aforementioned embodiments and Examples, but the present invention may be modified in various ways without departing from the scope or teaching of the present invention.

For example, while, in the above embodiments, the first heat sensitive element detects the heat conducted from the insulating film that has directly absorbed infrared radiation, an infrared absorbing film may also be formed on the insulating film directly above the first heat sensitive element. In this case, the infrared absorption effect obtained by the first heat sensitive element further improves, so that a favorable temperature difference can be obtained between the first heat sensitive element and the second heat sensitive element. Specifically, infrared radiation from the measurement object may be absorbed by the infrared absorbing film so that the temperature of the first heat sensitive element directly below the insulating film may be changed by heat conduction via the insulating film from the infrared absorbing film generated heat by infrared absorption.

The infrared absorbing film is formed of a material having a higher infrared absorptivity than that of the insulating film. As the infrared absorbing film, a film containing an infrared absorbing material such as carbon black or the like or an infrared absorbing glass film (borosilicate glass film containing 71% silicon dioxide) may be employed. In particular, it is preferable that the infrared absorbing film is an antimony-doped tin oxide (ATO) film. The ATO film exhibits excellent infrared absorptivity and excellent light resistance as compared with carbon black or the like. Also, the ATO film is cured by ultraviolet light so that strong bonding strength is obtained and the ATO film is not easily peeled off as compared with carbon black or the like.

It is preferable that the infrared absorbing film is formed to have a larger area than that of the first heat sensitive element so as to cover the first heat sensitive element.

While a chip thermistor is employed as each of the first heat sensitive element and the second heat sensitive element, a thin-film thermistor may also be employed as each of the first heat sensitive element and the second heat sensitive element.

As described above, although a thin-film thermistor or a chip thermistor is used as a heat sensitive element, a pyroelectric element or the like may also be employed other than a thermistor.

Furthermore, not only the sensor part but also a circuit part which is a detection circuit for sensor control connected to the sensor part may also be integrally provided on the resin film.

REFERENCE NUMERALS 1, 21: infrared sensor, 2, 22: insulating film, 2a: elongated hole, 2b: mounting hole 3: sensor part, 3A: first heat sensitive element, 3B: second heat sensitive element, 4A: first wiring film, 4B: second wiring film, 5A: first terminal electrode, 5B: second terminal electrode, 6: infrared reflection film, 7A: first terminal electrode, 7B: second terminal electrode, 8: sensor part reinforcing frame, 8a: sensor part window, 9: connector, 10: sealing member, 11: edge reinforcing plate, H: external member

What is claimed is:

1. An infrared sensor comprising:
   an insulating film;
   a first heat sensitive element and a second heat sensitive element that are disposed on one surface of the insulating film so as to be separated apart from one another;
   a first conductive wiring film and a second conductive wiring film that are formed on one surface of the insulating film and are respectively connected to the first heat sensitive element and the second heat sensitive element;
   an infrared reflection film that is disposed on the other surface of the insulating film so as to face the second heat sensitive element;
   a plurality of terminal electrodes that are connected to the first wiring film and the second wiring film, are formed on one end of the other surface of the insulating film, and are configured to be fitted into an external connector of a circuit substrate in perpendicular to the substrate;
   an edge reinforcing plate that is adhered to one end of one surface of the insulating film; and
   a mounting hole that is formed on the other end of the insulating film and configured to be fixed to an external member with facing to the substrate.

2. The infrared sensor according to claim 1, further comprising:
   a sensor part reinforcing frame on which a sensor part window corresponding to the region of the first heat sensitive element, the second heat sensitive element, and the infrared reflection film is formed and which is adhered to one surface of the insulating film so as to surround the region.

3. The infrared sensor according to claim 1, wherein a plurality of sensor parts each consisting of at least the first heat sensitive element, the second heat sensitive element, and the infrared reflection film is provided to the insulating film and all of the terminal electrodes corresponding to the sensor parts are formed on one end of the insulating film.

4. The infrared sensor according to claim 2, wherein a sealing member for sealing the sensor part window is adhered to the sensor part reinforcing frame.

5. The infrared sensor according to claim 1, wherein the first wiring film is arranged around the first heat sensitive element and is formed to have a larger area than that of the second wiring film.

* * * * *